United States Patent [19]

Mashino et al.

[11] Patent Number: 5,097,165
[45] Date of Patent: Mar. 17, 1992

[54] DUAL GENERATOR SYSTEM WITH FLOATING HIGHER VOLTAGE OUTPUT

[75] Inventors: Keiichi Mashino; Akihiro Saito; Masayoshi Tashiro, all of Katsuta, Japan

[73] Assignee: Hitachi, Ltd., Tokyo, Japan

[21] Appl. No.: 602,468

[22] Filed: Oct. 23, 1990

[30] Foreign Application Priority Data

Nov. 2, 1989 [JP] Japan .................. 1-284738

[51] Int. Cl.⁵ .................. H02K 23/50; B60L 1/10; H02J 7/14
[52] U.S. Cl. .................. 310/112; 307/84; 310/68 D
[58] Field of Search .................. 307/84, 16; 310/68 D, 310/112, 126; 322/90

[56] References Cited

U.S. PATENT DOCUMENTS

| | | | |
|---|---|---|---|
| 3,304,450 | 2/1967 | Bosco, Jr. et al. | 310/126 |
| 3,558,904 | 1/1971 | Kanngiesser | 307/84 |
| 3,683,199 | 8/1972 | Billings et al. | 307/84 |
| 4,282,443 | 8/1981 | Seidl | 310/112 |
| 4,424,464 | 1/1984 | Ikegami | 307/16 |
| 4,528,483 | 7/1985 | Müller | 310/112 |
| 4,678,982 | 7/1987 | Offiler et al. | 322/90 |
| 4,862,009 | 8/1989 | King | 290/22 |

*Primary Examiner*—Steven L. Stephan
*Assistant Examiner*—D. L. Rebsch
*Attorney, Agent, or Firm*—Ladas & Parry

[57] ABSTRACT

An ac generator system for a motor vehicle has a first voltage generating device (115-119) for producing a first output voltage and a second voltage generator device (105-109) for producing a second voltage, the second voltage being a higher voltage than the first voltage, the second voltage being electrically floating. In one embodiment the first and second voltage generating devices comprise an armature winding within which is rotatably mounted a respective field winding and a rectifier for producing a dc voltage from at least one of the armature windings. In another embodiment the second voltage device is a transformer and in a third embodiment the second voltage device is formed by a transformer and a pulse width modulator. In a fourth embodiment the second voltage device is formed by an inverter and in a fifth embodiment two armature windings are provided about a common field winding.

27 Claims, 6 Drawing Sheets

DUAL GENERATOR SYSTEM WITH FLOATING HIGHER VOLTAGE OUTPUT

BACKGROUND OF THE INVENTION

1. Field of the Invention

This invention relates to a generator system for a motor vehicle.

2. Description of Related Art

Motor vehicles are normally provided with an ac generator (alternator) to supply power for energizing lamps, motors, and various actuators. Such a generator is usually provided with a field winding and an armature winding, the field winding thereof being rotated by the engine to induce a rotating magnetic field and the armature winding thereby producing power having a comparatively low voltage of approximately 12 V.

Presently, however, the demand for an output voltage substantially higher than the present 12 V of the known generator is increasing, for instance, because of the requirement for use of commercial line home appliances on board a motor vehicle, and because of the increased number of components requiring high power, such as electrically heated windshields and seats. Such high power requirements also require large diameter cable which is inconvenient. As an example, twenty years ago a 35A, 12 V output generator was normal, but it is expected that by 1995 a generator having a 150A output will be required. Usually about 2 V is dropped across the rectifier stack in an ac generator, which means that in a 12 V system producing 150A, the power drop is $150 \times 2 = 300$ W whereas if the system voltage is increased to 48 V, for example, the power drop across the rectifier stack is $12/48 \times 150 \times 2 = 75$ W, i.e. a significant power saving and consequent reduction in heat and generator connecting cable size. It is, therefore, proposed to increase the supply voltage instead of the current capacity to energize the increasing number of car electronic components. A means for generating and supplying a voltage higher than the conventional generator 12 V by adding another generator is disclosed in Japan Patent Laid-Open No. 55-53152 (1980).

This prior art, however, has not paid attention to a possible danger that might be attendant with a high tension voltage. In this respect, for the sake of simplification of circuitry, one end of the output terminals of the generator is usually at ground potential. Because of such a design, even if a body part of a passenger inadvertently touches a connecting wire of the generator which is at other than ground potential, there is the danger that the whole voltage in the wire is likely to discharge through the body, thus jeopardizing passenger safety. It is an object of this invention to provide a motor vehicle generator system having enhanced safety.

SUMMARY OF THE INVENTION

According to this invention there is provided a generator system for a motor vehicle including first voltage generating means for producing a first output voltage and second voltage generating means for producing a second output voltage, the second voltage being adapted to be a higher voltage than the first voltage, and the second voltage being electrically floating.

Because of the above design in which the second voltage, which will preferably be a high voltage ac or dc voltage is floating, even if part of the body of an operator should inadvertently touch one of the high, second, voltage output connections, the voltage of the generator will not discharge through the body provided that the body does not also touch the other high voltage output connection.

As a consequence, the risk of inadvertent discharge of the generator voltage through the body is reduced, thereby enhancing safety of operation.

BRIEF DESCRIPTION OF THE DRAWINGS

The invention will now be described, by way of example, with reference to the accompanying drawings in which.

In the Figures, like reference numerals denote like parts.

DESCRIPTION OF PREFERRED EMBODIMENTS

First Embodiment

Figure 1:
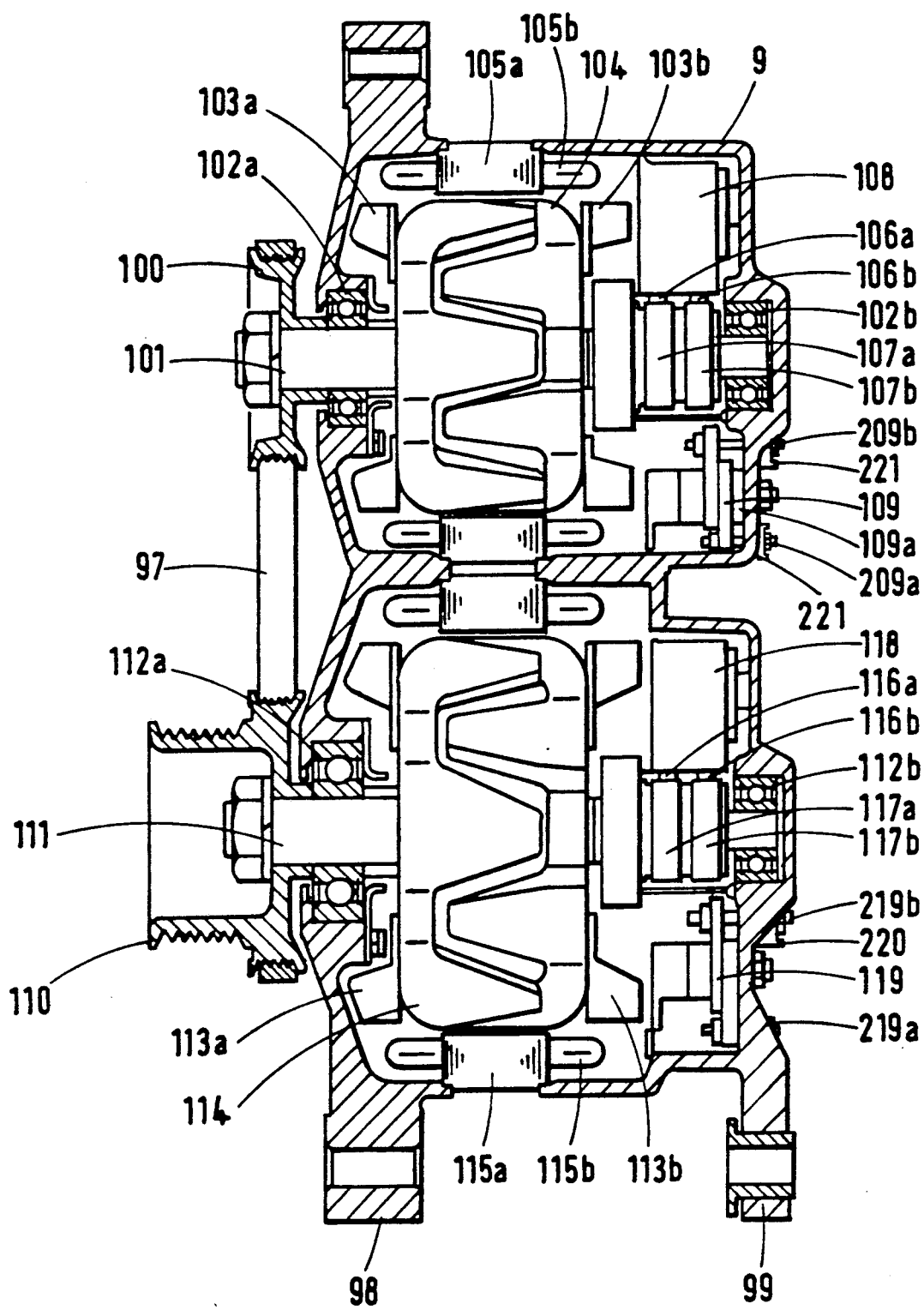
FIG. 1 shows a cross-sectional view of a generator system in accordance with this invention.

In FIG. 1, there is shown a generator (alternator) system having a housing 9 in which are disposed field windings 104, 114 each rotated by shafts 101 and 111 respectively to produce a rotating magnetic field. Both ends of the shafts 101 and 111 are located in bearings 102a, 102b and 112a, 112b carried by brackets 98 and 99. Shafts 101 and 111 are provided with slip rings 107a, 107b and 117a, 117b respectively, and the field windings 104 and 114 are electrically connected to voltage regulators 108 and 118 respectively through the slip rings 107a, 107b and 117a, 117b, and through the set of brushes 106a, 106b and 116a, 116b, respectively.

Armatures 105a and 115a circumferentially surround the field windings 104 and 114, respectively, and the armatures 105a and 115a have armature windings 105b and 115b respectively, and are electrically connected to three-phase full-wave rectifiers 109 and 119, respectively.

Although the three-phase full-wave rectifier 119 is electrically connected to the bracket 99, the three-phase full-wave rectifier 109 is not electrically connected to the bracket 99 but simply supported by the bracket through an insulation bush 109a.

The rectifier 119 has an output terminal 219a which is attached to the housing 9 and so is at ground potential and another output terminal 219b which, although mounted on the housing 9, is insulated therefrom by an insulating bush 220. The rectifier 109 has both output terminals 209a and 209b mounted on the housing 9 but insulated therefrom by insulating bushes 221 so that these terminals are electrically floating.

Pulleys 100 and 110 convey rotation to shafts 101 and 111 respectively, and these pulleys 100 and 110 are rotated synchronously by a belt 97. So as to ensure good air circulation within the housing 9 fan blades 103a, 103b and 113a, 113b are connected to shafts 101, 111 respectively at each side of the respective armatures 105a, 115a.

Figure 2:
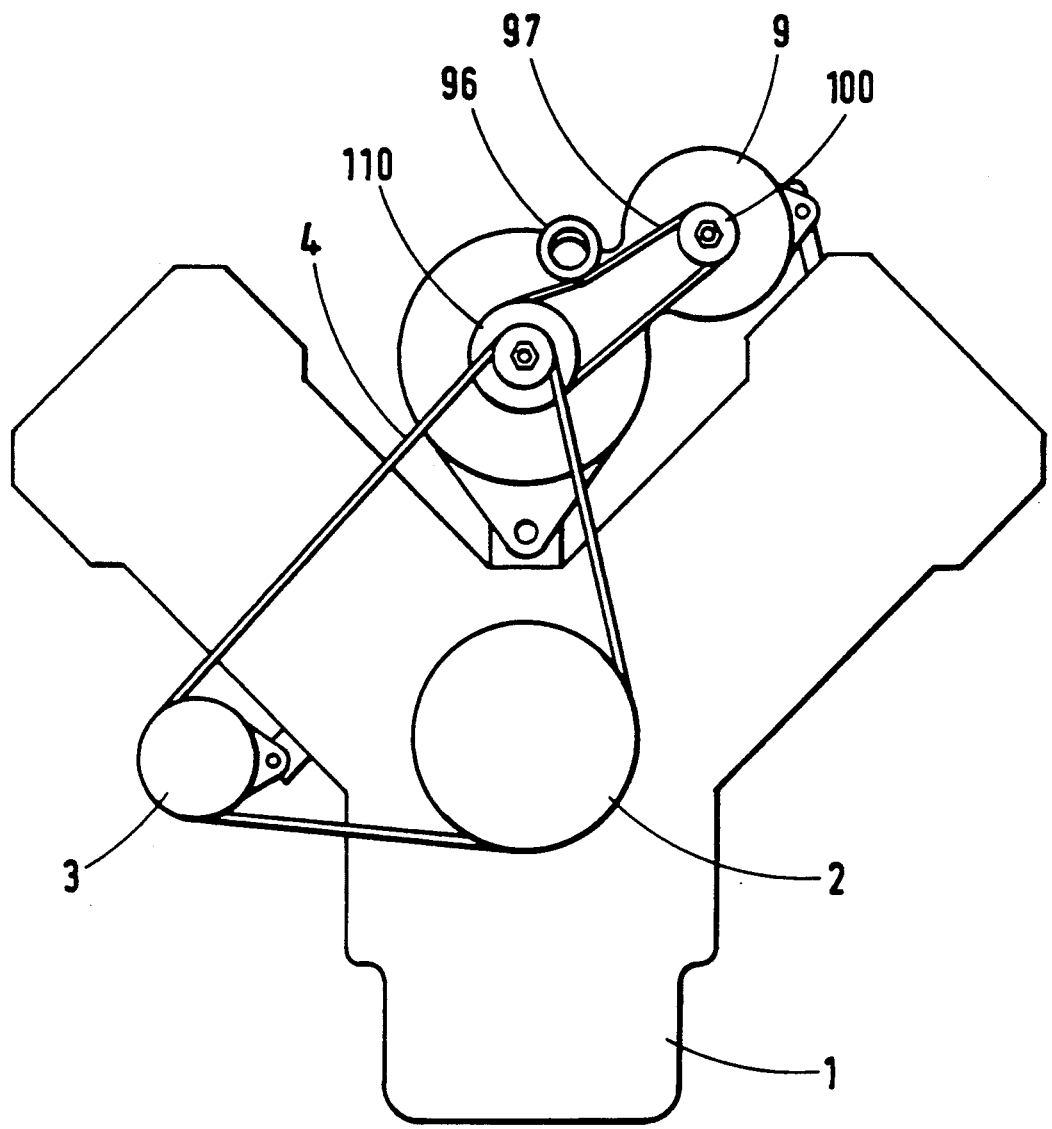
FIG. 2 shows the generator of FIG. 1 mounted in situ on an engine.

An actual schematic arrangement of such an engine is shown in FIG. 2, in which a V-shaped engine 1, i.e. having two banks of cylinders disposed in a V-shape, has a crankshaft 2 rotating synchronously with the engine, and an air-conditiioner's compressor shaft 3.

The rotation of the engine crankshaft 2 is conveyed to the shaft 3 and the pulley 110 of the generator 9 via a belt 4. The belt 97 has a tensioner 96 formed by a bearing member, the axle carrying the bearing member being movable, and biassed with a spring (not shown) on the outer side of the belt 97 so as to provide a desired tension to the belt 97. The generator 9 is placed between the rows of cylinders of the engine in order to make efficient use of the available engine room space.

A brief explanation of the function of the generator, constructed as described above, will now be given. With the rotation of the engine, field windings 104 and 114 are rotated to produce rotating magnetic fields, thereby inducing electromotive forces across armature windings 105b and 115b. The induced currents are rectified by the three-phase full-wave rectifiers 109 and 119 to obtain dc currents. The number of windings in each of the windings 105b and 115b are different from one another so that the output of the armature 105b may have a sufficiently higher voltage than that of the armature 115b, for example, 100 V for the former, and 12 V for the latter.

Figure 3:
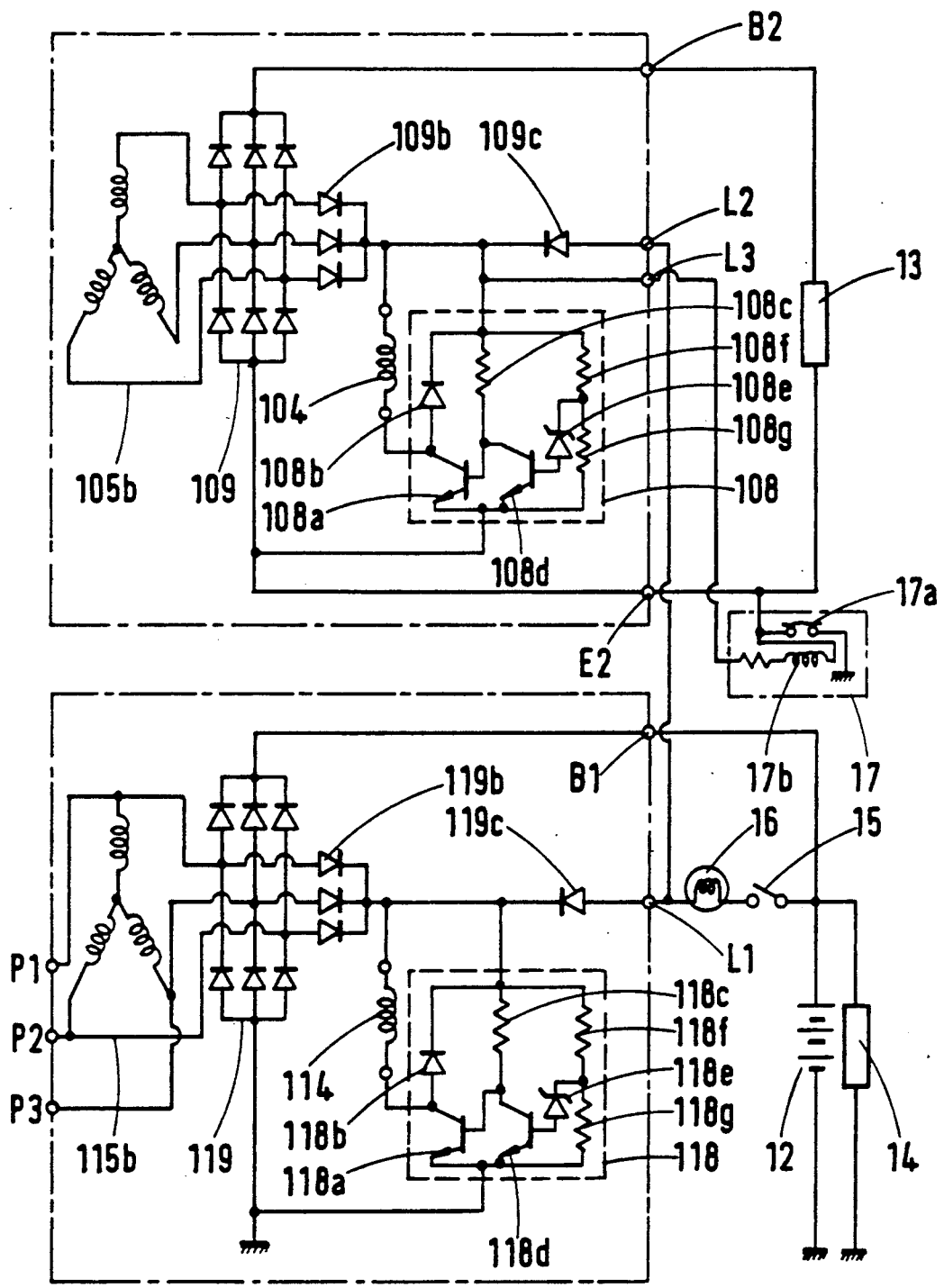
FIG. 3 shows a circuit diagram of the generator system shown in FIG. 1.

The circuitry of the generator is shown in FIG. 3. In FIG. 3, the output ends of the full-wave rectifier 109 are connected to a high voltage load 13 through a positive terminal B2 and a negative terminal E2. Regarding the high voltage load 13, for safety and reduction in cabling cost, it is preferable to use a higher voltage so as to reduce the current required, and such a load may be an air conditioner, a heated windshield, an actuator and tee like. Further, by employing a configuration wherein a high voltage is supplied to the high voltage load through both the positive terminal B2 and negative terminal E2, inadvertent discharge to an operator by mere contact with a connecting wire connected thereto can be prevented because both terminals B2 and E2 are electrically floating. On the other hand, the output from the full-wave rectifier 119 is supplied to a low voltage load 14 and a battery 12 through a terminal B1 and the ground potential terminal. The low voltage load 14 may be lighting lamps and the like, which in an automobile require a low voltage because their filaments cannot be made too thin otherwise they will not endure vibration during driving.

For each armature winding, an auxiliary full-wave rectifier 109b, 119b is connected to the battery 12 through diodes 109c and 119c respectively, a charging indication lamp 16, and a key switch 15. The auxiliary full wave rectifiers are also connected to the field windings 104, 114 and voltage regulators 108, 118. A normally closed relay 17 is connected between terminal E2 and the voltage regulator 108. The voltage regulators 108, 118 are formed respectively by power transistors 108a and 118a which switch on and off energizing currents to the field windings, flywheel diodes 108b and 118b, voltage dividing resistors 108f, 118f and 108g, 118g, zener diodes 108e and 118e, control resistors 108c and 118c, and control transistors 108d and 118d.

Operation of the circuitry of such an AC generator will now be explained. When the key switch 15 is closed, the charging indication lamp 16 turns on, and a current from the battery 12 flows through the field windings 104 and 114, and power transistors 108a and 118a, the moving contact 17a of the relay 17 being normally closed. Thereby, the voltage regulator 108 is electrically connected in a completed circuit with the battery 12 by virtue of the ground potential terminal of the relay 17 and the ground potential terminal of the battery 12.

At that time, the electrical resistance of the power generation indication lamp 16 is set approximately at 40 Ohms and the resistance of the field windings 104 and 114 are set at 12 ohms and 3 ohms respectively. For a preset battery voltage of 12 V, approximately 0.3 A of current flows.

When the engine is started, and field windings 104 and 114 are energized to produce rotating magnetic fields, voltages are induced across the armature windings 105b and 115b. Thereby, field currents are supplied to the field windings 104 and 114 from the auxiliary full-wave rectifiers 109b and 119b. When supplied with the field currents the output voltages from the auxiliary full-wave rectifiers 109b and 119b become sufficiently large, and when the voltage across the indication lamp 16 drops so it goes out, the current supply from the battery is cut off, thereby turning off the charging indication lamp 16. At the same time, the relay 17 armature coil 17b is excited to open the moving contact 17a to cut off the voltage regulator 108 from the ground potential terminal.

When the number of revolutions of the engine are increased to raise the output voltage of the auxiliary rectifiers 109b and 119b, a divider voltage divided by dividing resistors 108f, 108g and 118f, 118g exceeds preset values, turning on the zener diodes 108e and 118e. Thereby, transistors 108d and 118d are turned on. Because the power transistors 108a and 118a are off, the currents flowing through the field windings 104 and 114 are suppressed to limit the output voltage of the armature windings 105b and 115b. On the other hand, when the currents flowing through the field windings 104 and 114 are suppressed, the output voltages from the auxiliary full-wave rectifiers 109b and 119b drop, turning the power transistors 108a and 118a on. Thereby once again, the currents flowing through the field windings are increased to raise the output voltage from the armature windings. By alternating the on and off states of the power transistors, the output voltages of the armature windings 105b and 115b are kept approximately constant.

Furthermore, because the charging indication lamp is used in conjunction with both armatures, as a dual mode, the status of both armature outputs is possible to be displayed by a single charging indication lamp.

A Second Embodiment

A second embodiment will now be described with reference to FIG. 4, in which a generator 11 provides a three phase ac output which is full wave rectified to produce, for example, 12 V dc which is supplied to the battery 12 and the low voltage load 14. The three phase ac output from the generator is also supplied to a transformer 5 through connecting wires P1, P2 and P3 respectively. The transformer 5 as shown in FIG. 5, comprises a first transformer 51a, a second transformer 51b and a third transformer 51c, and steps up each of the three phase AC outputs from the generator 11. If a winding ratio of the primary and secondary windings in the transformer is set for instance to be 1 to 4 for an output of 12 V of the generator, it is possible to obtain an output of 48 V from the transformer. Further, after rectifying the output voltage from the transformer with a full wave rectifier 52, a positive voltage and a negative voltage are supplied to the high voltage load 13 through a positive side terminal and a negative side terminal.

Such means for obtaining a high voltage by stepping up the output voltage from the generator using a transformer, facilitates enhanced insulation both at the high voltage and low voltage sides, because the primary winding and the secondary winding are electrically insulated and spatially isolated. Thereby, electrical connection between the high voltage and the low voltage sides will be reduced, enhancing insulation capability both at the high voltage and the low voltage sides.

A Third Embodiment

A third embodiment of the present invention will now be described.

Figure 6:
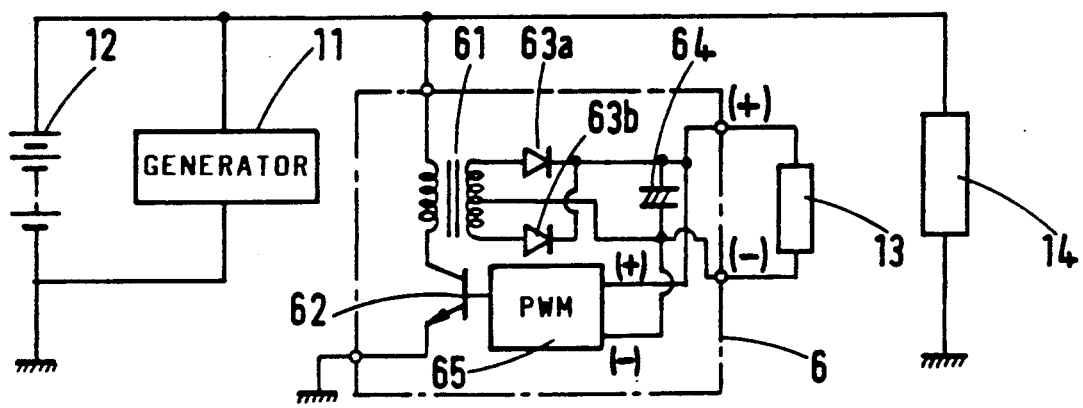
FIG. 6 another embodiment of a generator system in accordance with this invention using a pulse width modulator (PWM)

Referring to FIG. 6, a rectified dc output from the generator 11 is supplied to the battery 12 and to the high voltage load 13 after being stepped up in a voltage transformer 6.

The voltage transformer 6 includes a transformer 61, one terminal of the primary winding of the transformer 61 being connected to the generator 11, and the other terminal being connected via a transistor 62, to ground potential. Terminals of the secondary winding of the transformer 61 are connected to single half-wave rectifiers 63a and 63b, respectively. The output therefrom is connected to a positive terminal and a negative terminal respectively of the load 13 via a capacitor 64, the negative terminal also being connected to a pulse width modulation (PWM) circuit 65. In addition, the base of the transistor 62 is connected to the PWM 65.

The function of the voltage transformer 6 is as follows.

Firstly, the primary side of the transformer 61 is turned on/off by the transistor 62 in response to output from the PWM 65. Responding to the on/off state of the transistor 62, a voltage is induced across the secondary winding of the transformer. The induced voltage is rectified in single half-wave rectifiers 63a and 63b, and smoothed in voltage by the capacitor 64, to supply the high voltage load 13. In addition, the PWM 65 detects the voltage supplied to the low voltage load 13. When the voltage is measured to be higher than a predetermined value, the PWM 65 reduces on-duty pulsed signals to the transistor 62 thereby decreasing the output voltage at the secondary side of the transformer 61. Conversely, when the voltage is higher than the predetermined value, the PWM increases the on-duty pulses to the tranformer 61 to increase the off voltage at the transistor 61. In this manner, the voltage to be supplied to the high voltage load is maintained approximately constant.

Figure 7:
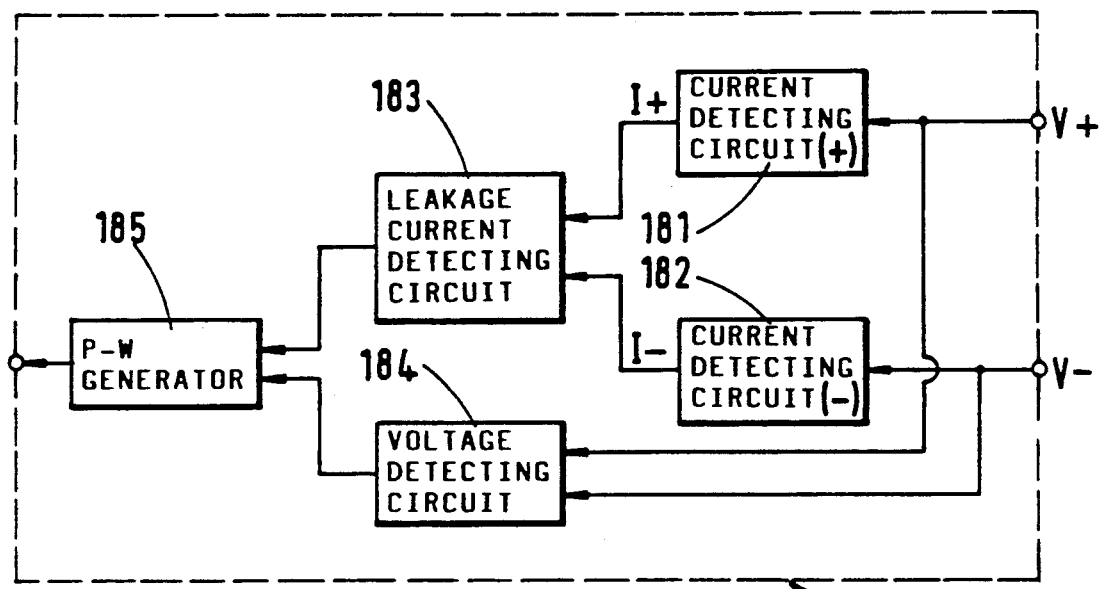
FIG. 7 shows a circuit diagram of the PWM used in FIG. 6.

A detailed construction of the PWM 65 is shown in FIG. 7. The voltages V+ and V− to supply to the high voltage load are conducted to a voltage detecting circuit 184, and, in dependence upon these voltages, the PWM circuit duty generator 185 outputs a duty signal. The voltages V+ and V− supplied to the high voltage load are also conducted to a plus side current detecting circuit 181 and a minus side current detecting circuit 182, respectively. Furthermore, a leakage current detecting circuit 183 acts on the PWM circuit duty generator 185 when these currents at the plus side and the minus side exceed predetermined values, i.e. when there is leakage current from either the plus or minus side to ground potential. The duty generator 185 is thereby actuated to reduce the duty output, suppressing further generation of electricity.

Figure 8:
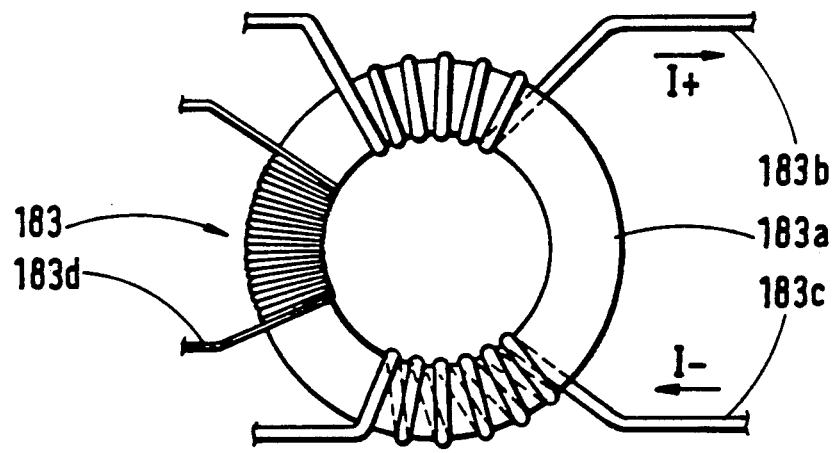
FIG. 8 shows a current leakage detecting circuit used in FIG. 7.

A detailed view of the leakage current detecting circuit 183 is shown in FIG. 8. A toroidal core 183a is provided with a voltage output winding 183b to conduct therethrough an output current from the plus side current detecting circuit 181, a voltage output winding 183c to conduct therethrough the output current from the minus side current detecting circuit 182, and a detecting winding 183d for producing a voltage thereacross for detecting leakage currents to ground potential, the winding 183d being connected to a comparator (not shown).

The magnetic flux induced by the plus side output voltage winding 183b and that induced by the minus side output voltage winding 183c are in opposed directions, thereby cancelling one another when they are equal in magnitude. No voltage is induced across the detecting winding 183d in this case. Conversely, when the induced magnetic flux is not equal in magnitude, a voltage is induced across the detecting winding 183d as indicative of a leakage current, thereby suppressing the duty output in the duty generator 185, and suppressing further generation of electricity.

Figure 4:
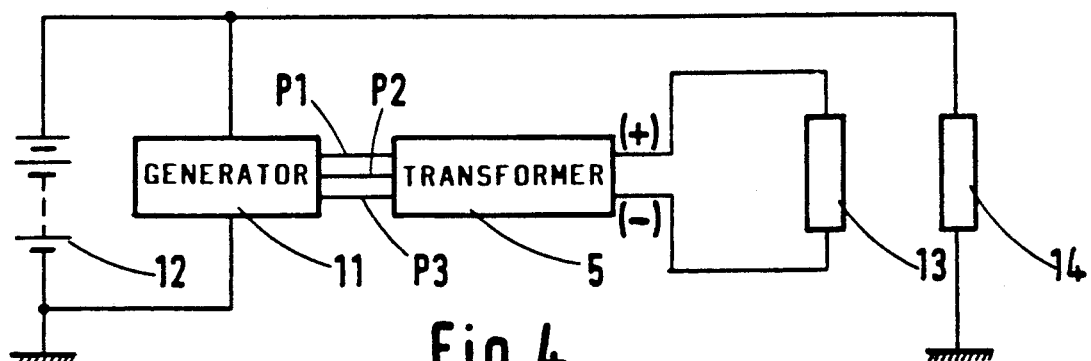
FIG. 4 shows a further embodiment of a generator system in accordance with this invention using a transformer.
Figure 5:
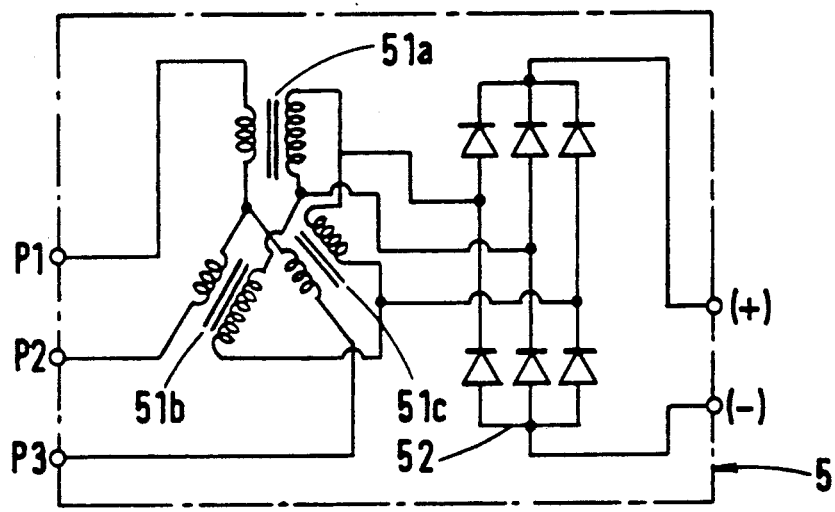
FIG. 5 shows a circuit diagram of the transformer used in FIG. 4.

In addition, because the high voltage is obtained by using a transformer, insulation at the high voltage side is readily achievable in like manner as the previously described embodiment of FIG. 4. Further, because a high voltage is induced across the secondary winding in the transformer 61 in such manner thereby turning on and/or off the transistor 62, a high voltage output is readily obtainable, through the installation of a relatively compact voltage transformer, without the necessity of adding another generator for high voltage load use. Still further, because the average generator outputs a dc voltage as its standard output to facilitate charging a batter a high voltage is readily obtainable using such standard dc outputs.

A Fourth Embodiment

Figure 9:
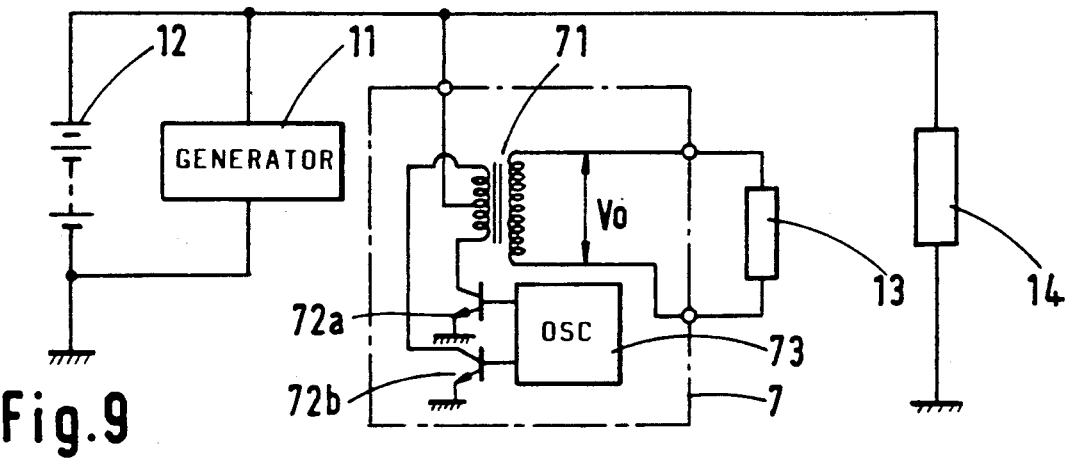
FIG. 9 shows a schematic diagram of another generator system in accordance with this invention using a two-phase oscillator.

A fourth embodiment of the present invention providing an ac voltage output will now be described referring to FIG. 9 which shows a DC output from generator 11 inverted to an ac high voltage in an inverter 7 to thereby supply the ac high voltage load 13.

In the inverter 7, the middle point tap on the primary winding of a transformer 71 is connected to the generator 11, and both end taps of the winding are connected to grounded emitter transistors 72a, 72b, respectively, while the secondary winding is connected to the positive side terminal and the negative side terminal of the load 13. The base terminals of the transistors are connected to a two-phase oscillator 73.

Figure 10A:
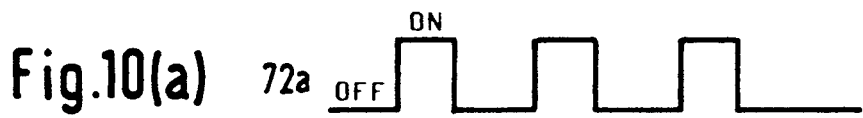
FIG. 10 (a)-(c) shows cyclic wave forms of FIG. 9.
Figure 10B:
Figure 10C:
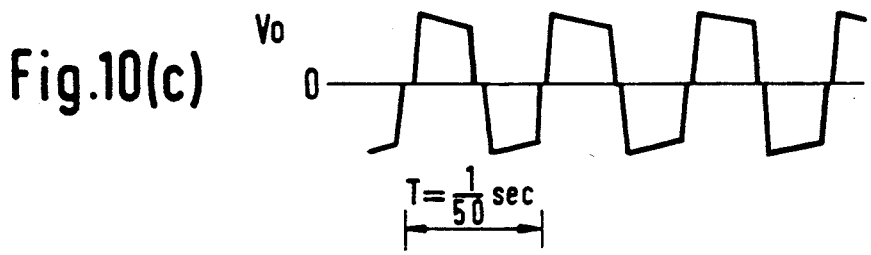

In the following, the function of the inverter 7 is explained. Duty signals as shown in FIGS. 10(a) and 10(b) are generated in a two-phase oscillator and are fed to the transistor 72a and transistor 72b, respectively. Responding to such signals, currents are generated or degenerated in turns across the primary winding of the transformer 71, thereby inducing an ac voltage as shown in FIG. 10(c) across the secondary winding of the transformer 71.

In addition, by appropriately setting the cycle of the duty output from the two-phase oscillator 73, the voltage across the secondary winding in the transformer is possible to be set at a constant approximate 50 Hz or 60 Hz. Also by appropriately setting a ratio of the numbers of windings between the primary and the secondary windings, the voltage across the secondary winding of the transformer 71 is possible to be set approximately at 100 V. In this manner, an output voltage of 100 V at 50 Hz, or 100 V at 60 Hz is readily obtained by this invention, facilitating the use of equipment previously powered by a commercial line, on board a motor vehicle.

A Fifth Embodiment

Figure 11:
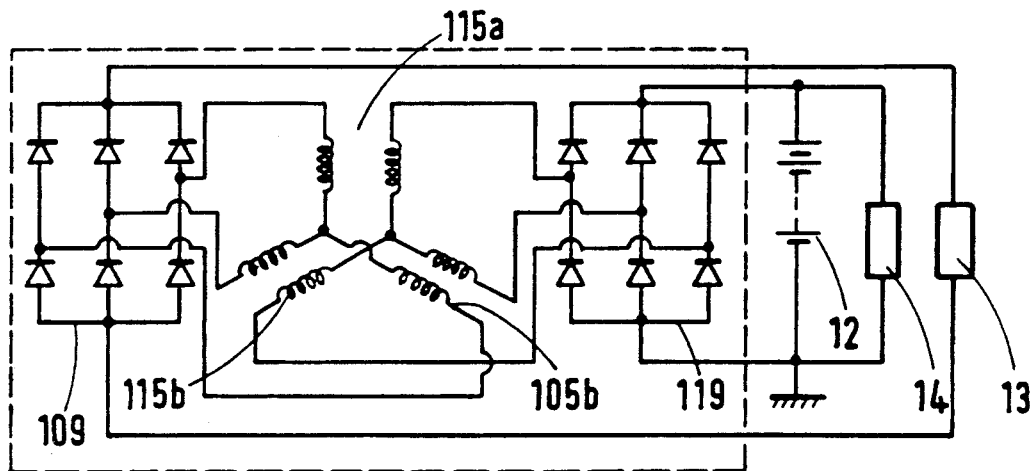
FIG. 11 is a circuit diagram of yet another generator system in accordance with this invention wherein two system armature windings are employed.

A fifth embodiment of this invention will now be described. Referring to FIG. 11, ac generator 11a has a common field winding and an armature 115a incorporating armature windings 105a and 115b of two different systems. Here, the number of windings of the armature winding 105b is larger than that of the armature winding 115b so as to produce higher voltage thereacross. The output from the armature winding 105b, after rectification in a full-wave rectifier 109, is fed to the high voltage load 13, while the output from the armature winding 115b, after rectification in a full-wave rectifier 119, is fed to the low voltage load 14.

By substituting armature windings of two different systems for the conventional winding in a generator, a high voltage power supply as well as a low voltage power supply is obtained. Also there is no need for providing an additional voltage regulator for the high voltage power supply. Thereby, a relatively compact high voltage power supply may be provided. Although full wave rectification is disclosed herein it is to be understood that this invention is also applicable to circumstances where only half wave rectification is required.

In the present invention, as described above, the chance of, and severity of, any electrical shock that might be attendant to an inadvertent discharge of a generator voltage to an operator is reduced, thereby substantially enhancing safety.

It will be understood by those skilled in the art that various amendments and modifications may be made to the above described exemplary embodiments without departing from the spirit and scope of the invention which is defined by the appended claims.

We claim:

1. A dual generator system for a motor vehicle including a housing supporting first voltage generating means for producing a first output voltage at first output terminals of said housing and second voltage generating means for producing a second output voltage at second output terminals of said housing, the second output voltage being a higher voltage than the first output voltage, and the second output terminals being insulated from said housing by insulating bush means so as to be electrically floating.

2. A dual generator system as claimed in claim 1 wherein the first voltage generating means produces a dc power supply and one of said first output terminals is at ground potential.

3. A dual generator system as claimed in claim 2 wherein the first and second voltage generating means each comprise an armature winding within which is rotatably mounted a respective field winding arranged to be driven by a prime mover, both said field windings being able to produce an electrical ac current in their associated armature windings, and rectifier means being provided for producing dc voltage from at least one of the armature windings.

4. A dual generator system as claimed in claim 3 wherein the first voltage generating means produces dc voltage output and the second voltage generating means produces ac voltage output.

5. A dual generator system as claimed in claim 3 wherein both the first and second generator means produce a dc voltage output.

6. A dual generator system as claimed in claim 1 wherein the first and second voltage generating means are located in the same housing.

7. A dual generator system as claimed in claim 1 wherein the first generating means comprises an armature winding within which is rotatably mounted a field winding arranged to be driven by a prime mover for producing a three phase ac power output, and a rectifier means producing a dc power output therefrom.

8. A dual generator system as claimed in claim 7 wherein the armature winding for producing said three phase ac power output is connected to said second voltage generating means which comprises a transformer connected to supply an ac output to a rectifier wherein the output terminals of said rectifier comprise said second output terminals.

9. A dual generator system as claimed in claim 7 wherein the output from the rectifier means is connected to a step up transformer means in circuit with a switching means for controlling the output from said rectifier means to said transformer means in dependence upon a load, the output of said transformer means being connected to a further rectifier for producing at least half wave rectification for said electrically floating voltage to said load at said second output terminals.

10. A dual generator system as claimed in claim 9 wherein said switching means comprises a pulse width modulator controlling a power transistor connected in the input of said transformer means.

11. A dual generator system as claimed in claim 9 wherein a ground potential leakage current detector is connected between the second output terminals supplying said floating voltage and said pulse width modulator whereby said pulse width modulator cuts off current to said transformer means if current leakage is detected to be above a predetermined level.

12. A dual generator system as claimed in claim 7 wherein an inverter is connected to the output from said rectifier means for producing an ac floating power output voltage.

13. A dual generator system as claimed in claim 1 wherein the first and second generating means both comprise first and second armature windings respectively and a common field coil.

14. A dual generator system as claimed in claim 7 wherein said prime mover is an internal combustion engine.

15. A duel generator system as claimed in claim 1 wherein the first and second generating means are located in the same housing and each comprise a respective armature winding within which is rotatably mounted a respective field winding and said field windings are mounted on respective shafts which are linked to be driven by a common drive means.

16. A dual generator system as claimed in claim 15 wherein said drive means comprises a pulley attached to each of the shafts of the field coils and continuous loop means connected around the pulleys.

17. A dual generator system as claimed in claim 16 wherein one of the shafts is connected to be driven by a prime mover.

18. A dual voltage generator as claimed in claim 1 wherein said output terminals are rigid and extend through said housing and one of said first output terminals is connected to said housing and another of said first output terminals and said second output terminals are insulated from said housing by said insulating bush means.

19. A dual generator system for a motor vehicle including first voltage generating means for producing a first output voltage at first output terminals, said first generating means comprising an armature winding within which is rotatably mounted a field winding arranged to be driven by a prime mover for producing a three phase ac power output, a rectifier means producing a dc power output therefrom, and a second voltage generating means connected to said armature winding for producing said three phase ac power output, said second voltage generating means comprising a step up transformer connected to supply an ac output to a further rectifier means, the further rectifier means being connected to second output terminals, said further rectifier means producing a higher voltage than the first output voltage and the second output terminals being electrically floating.

20. A dual generator system for a motor vehicle including first voltage generating means for producing a first output voltage at first output terminals, said first generating means comprising an armature winding within which is rotatably mounted a field winding arranged to be driven by a prime mover for producing a three phase ac power output and a rectifier means producing a dc output therefrom, the output from the rectifier means being supplied to a second voltage generating means for producing a second voltage output at second output terminals, said second voltage generating means comprising a step up transformer means for receiving output from the rectifier means, said step up transformer means being connected in circuit with a switching means for controlling the output from said rectifier means to said transformer means in dependence upon a load, the output of said transformer means being connected to a further rectifier for producing at least half wave rectification to said second output terminals, and said second output terminals being electrically floating.

21. A dual generator system as claimed in claim 20 wherein said switching means comprise a pulse width modulator controlling a power transistor connected in the input of said transformer means.

22. A dual generator system for a motor vehicle including first voltage generating means for producing a first output voltage at first output terminals, said first generating means comprising an armature winding within which is rotatably mounted a field winding arranged to be driven by a prime mover for producing a three phase ac power output and a rectifier means producing a dc output therefrom, the output from the rectifier means being supplied to a second voltage generating means for producing a second voltage output at second output terminals, said second voltage generating means comprising a step up transformer means for receiving output from the rectifier means, said step up transformer means being connected in circuit with a pulse width modulator for controlling the output from said rectifier means to said transformer means in dependence upon a load, the output of said transformer means being connected to a further rectifier means for producing at least half wave rectification to said second output terminals, said second output terminals being electrically floating, a ground potential leakage current detector connected between said second output terminals and said pulse width modulator, said pulse width modulator cutting off current to said transformer means if current leakage is detected by said current leakage detector to be above a predetermined level.

23. A dual generator system for a motor vehicle including first voltage generating means for producing a first output voltage at first output terminals, said first generating means comprising an armature winding within which is rotatably mounted a field winding arranged to be driven by a prime mover for producing a three phase ac power output, and a second voltage generating means for producing a second output voltage at second output terminals, the second voltage generating means comprising an inverter connected to the output from said rectifier means for producing an ac voltage output which is at a higher voltage than the first voltage, and the second output terminals being electrically floating.

24. A dual voltage generator system for a motor vehicle including first voltage generating means for producing a first output voltage at first output terminals and second voltage generating means for producing a second output voltage at second output terminals, the second output voltage being higher than the first output voltage, and means sensitive to excitation of said second voltage generating means for changing the condition of one of said second output terminals from a condition where said one second output terminal is connected to a fixed potential source to a condition where said one second output terminal is electrically floating, and wherein the other of said second output terminals is permanently electrically floating.

25. A dual voltage generator system according to claim 24 further including a housing for said system, there being provided a pair of first output terminals, one of said first output terminals being connected to said housing, the other said first output terminals and a pair of said second output terminals being insulated by an insulator means from said housing, said means sensitive to excitation comprising a relay having one terminal thereof connected to said one second output terminal and another terminal of said relay being connected to said housing, whereby a coil of said relay is sensitive to excitation of said second voltage generating means to cause a movable contact of said relay to short-circuit the terminals of said relay so that said one second output terminal is connected to said housing below a predetermined excitation of said second voltage generating means and is electrically floating above said predetermined excitation.

26. A dual generator system for a motor vehicle including first generating means for producing a first output vehicle at first output terminals and second voltage generating means for producing a second output voltage at a pair of second output terminals, the first and second voltage generating means each comprising an armature winding within which is rotatably mounted a respective field winding arranged to be driven by a prime mover, both said field windings being able to produce an electrical ac current in their associated armature windings, rectifier means being provided for producing dc voltage from at least one of the armature windings, and means sensitive to excitation of said second voltage generating means field winding for changing the condition of one of said second output terminals from a condition where said one second output terminal is connected to a fixed potential to a condition where said one terminal is electrically floating, and wherein the other second output terminal is permanently electrically floating.

27. A dual voltage generator system according to claim 26 further including a housing for said system, there being provided a pair of first output terminals, one of said first output terminals being connected to said housing, the other said first output terminals and the pair of said second output terminals being insulated by an insulator means from said housing, said means sensitive to excitation comprising a relay having one terminal thereof connected to said one second output terminal and another terminal of said relay being connected to said housing, whereby a coil of said relay is sensitive to excitation of said second voltage generating means to cause a movable contact of said relay to short-circuit the terminals of said relay so that said one second output terminal is connected to said housing below a predetermined excitation of said second voltage generating means and is electrically floating above said predetermined excitation.

* * * * *